(12) United States Patent
Mittal et al.

(10) Patent No.: US 12,322,175 B2
(45) Date of Patent: Jun. 3, 2025

(54) SYSTEM AND METHOD FOR DETECTING FABRICATED VIDEOS

(71) Applicant: University of Maryland, College Park, College Park, MD (US)

(72) Inventors: Trisha Mittal, College Park, MD (US); Uttaran Bhattacharya, College Park, MD (US); Rohan Chandra, College Park, MD (US); Aniket Bera, Greenbelt, MD (US); Dinesh Manocha, Greenbelt, MD (US)

(73) Assignee: University of Maryland, College Park, College Park, MD (US)

( * ) Notice: Subject to any disclaimer, the term of this patent is extended or adjusted under 35 U.S.C. 154(b) by 392 days.

(21) Appl. No.: 17/515,846

(22) Filed: Nov. 1, 2021

(65) Prior Publication Data

US 2022/0138472 A1     May 5, 2022

Related U.S. Application Data

(60) Provisional application No. 63/107,803, filed on Oct. 30, 2020.

(51) Int. Cl.
*G10L 25/63*     (2013.01)
*G06F 18/22*     (2023.01)
(Continued)

(52) U.S. Cl.
CPC ............ *G06V 20/41* (2022.01); *G06F 18/22* (2023.01); *G06N 3/045* (2023.01); *G06N 3/048* (2023.01);
(Continued)

(58) Field of Classification Search
CPC .......... G06N 3/045; G10L 25/30; G10L 25/63
See application file for complete search history.

(56) References Cited

U.S. PATENT DOCUMENTS 11,073,899 B2      7/2021    Kaliouby et al.
2021/0209388 A1    7/2021    Ciftci et al.

FOREIGN PATENT DOCUMENTS

CN        111839551 A      10/2020

OTHER PUBLICATIONS

Albanie, S., Nagrani, A., Vedaldi, A., & Zisserman, A. (2018). Emotion recognition in speech using cross-modal transfer in the wild. Retrieved from http://arxiv.org/abs/1808.05561 (Year: 2018).*

(Continued)

*Primary Examiner* — Bobbak Safaipour
*Assistant Examiner* — Ashley L. Hytrek
(74) *Attorney, Agent, or Firm* — Leveque IP Law, P.C.

(57) ABSTRACT

A video is classified as real or fake by extracting facial features, including facial modalities and facial emotions, and speech features, including speech modalities and speech emotions, from the video. The facial and speech modalities are passed through first and second neural networks, respectively, to generate facial and speech modality embeddings. The facial and speech emotions are passed through third and fourth neural networks, respectively, to generate facial and speech emotion embeddings. A first distance, $d_1$, between the facial modality embedding and the speech modality embedding is generated, together with a second distance, $d_2$, between the facial emotion embedding and the speech emotion embedding. The video is classified as fake if a sum of the first distance and the second distance exceeds a threshold distance. The networks may be trained using real and fake video pairs for multiple subjects.

20 Claims, 9 Drawing Sheets

(51) Int. Cl.
    G06N 3/045    (2023.01)
    G06N 3/048    (2023.01)
    G06N 3/08     (2023.01)
    G06V 20/40    (2022.01)
    G06V 40/16    (2022.01)
    G10L 25/30    (2013.01)
(52) U.S. Cl.
    CPC .............. *G06N 3/08* (2013.01); *G06V 20/46* (2022.01); *G06V 20/48* (2022.01); *G06V 40/174* (2022.01); *G10L 25/30* (2013.01); *G10L 25/63* (2013.01)

(56) References Cited

OTHER PUBLICATIONS

Eskimez, S. E., Zhang, Y., & Duan, Z. (2020). Speech driven talking face generation from a single image and an emotion condition. Retrieved from http://arxiv.org/abs/2008.03592 (Year: 2020).*

Chugh et al., "Not made for each other . . . " In Proceedings of the 28th ACM International Conference on Multimedia (MM '20). Association for Computing Machinery, New York, NY, USA, Oct. 12, 2020, pp. 439-447. DOI:https://doi.org/10.1145/3 (Year: 2020).*

Ciftci et al., "FakeCatcher: Detection of Synthetic Portrait Videos using Biological Signals," in IEEE Transactions on Pattern Analysis and Machine Intelligence, Jul. 15, 2020, doi: 10.1109/TPAMI.2020.3009287. (Year: 2020).*

Lewis et al., "Deepfake Video Detection Based on Spatial, Spectral, and Temporal Inconsistencies Using Multimodal Deep Learning,"2020 IEEE Applied Imagery Pattern Recognition Workshop (AIPR), Oct. 13, 2020, pp. 1-9, doi: 10.1109/ AIPR50011.2020.9425167. (Year: 2020).*

Li. (2017). Convolutional Neural Networks for Visual Recognition, Module 2. Stanford. https://github.com/cs231n/cs231n.github.io/blob/ba3185bdbdac623bcc45962e1ea5ca38893a7aad/convolutional-networks.md URL to entire, current course notes: https://cs231n.github.io/ (Year: 2017).*

Chintha et al., "Recurrent Convolutional Structures for Audio Spoof and Video Deepfake Detection," in IEEE Journal of Selected Topics in Signal Processing, vol. 14, No. 5, pp. 1024-1037, Jun. 1, 2020, doi: 10.1109/JSTSP.2020.2999185.

Chugh et al., "Not made for each other—Audio-Visual Dissonance-based Deepfake Detection and Localization," In Proceedings of the 28th ACM International Conference on Multimedia (MM '20). Association for Computing Machinery, New York, NY, USA, Oct. 12, 2020, pp. 439-447. DOI:https://doi.org/10.1145/3394171.3413700.

Ciftci et al., "FakeCatcher: Detection of Synthetic Portrait Videos using Biological Signals," in IEEE Transactions on Pattern Analysis and Machine Intelligence, Jul. 15, 2020, doi: 10.1109/TPAMI.2020.3009287.

Lewis et al., "Deepfake Video Detection Based on Spatial, Spectral, and Temporal Inconsistencies Using Multimodal Deep Learning," 2020 IEEE Applied Imagery Pattern Recognition Workshop (AIPR), Oct. 13, 2020, pp. 1-9, doi: 10.1109/AIPR50011.2020.9425167.

Lomnitz et al., "Multimodal Approach for DeepFake Detection," 2020 IEEE Applied Imagery Pattern Recognition Workshop (AIPR), Oct. 13, 2020, pp. 1-9, doi: 10.1109/AIPR50011.2020.9425192.

\* cited by examiner

800

802

SYSTEM AND METHOD FOR DETECTING FABRICATED VIDEOS

CROSS-REFERENCE TO RELATED APPLICATIONS

This application claims the benefit of U.S. Provisional Application Ser. No. 63/107,803 (filed on Oct. 30, 2020) entitled "System and Method for Detecting Fabricated Videos," the entire content of which is hereby incorporated by reference herein.

STATEMENT REGARDING FEDERALLY SPONSORED RESEARCH OR DEVELOPMENT

This invention was made with government support under W911NF-19-1-0069 and W911NF-19-1-0315, awarded by the Army Research Laboratory—Army Research Office. The government has certain rights in the invention.

TECHNICAL FIELD

The present disclosure generally relates to computer systems and internet services. More particularly, the present disclosure relates to computer systems that detect forged or fabricated videos using neural networks.

BACKGROUND

Recent advances in computer vision and deep learning have enabled the creation of sophisticated and compelling forged versions of social media images and videos, also known as "deepfakes." Due to a surge in deepfake content produced by Artificial Intelligence (AI) synthesis, multiple attempts have been made to release benchmark datasets and algorithms for deepfake detection. Deepfake detection methods may employ neural networks to classify an input video or image as "real" or "fake."

A neural network models the relationships between input data or signals and output data or signals using a network of interconnected nodes trained through a learning process. The nodes are arranged into various layers, including, for example, an input layer, one or more hidden layers, and an output layer. The input layer receives input data, such as, for example, image data, speech data, etc., and the output layer generates output data, such as, for example, a probability that the image data contains a known object, a known voice, etc. Each hidden layer provides at least a partial transformation of the input data to the output data.

However, prior deepfake detection methods exploit only a single modality, such as facial cues, from these "deepfake" videos either by employing temporal features or by exploring the visual artifacts within frames.

BRIEF DESCRIPTION OF THE DRAWINGS

The accompanying drawings provide visual representations which will be used to describe various representative embodiments and can be used by those skilled in the art to better understand the representative embodiments disclosed and their inherent advantages. In these drawings, like reference numerals identify corresponding or analogous elements.

DETAILED DESCRIPTION

Figure 1:
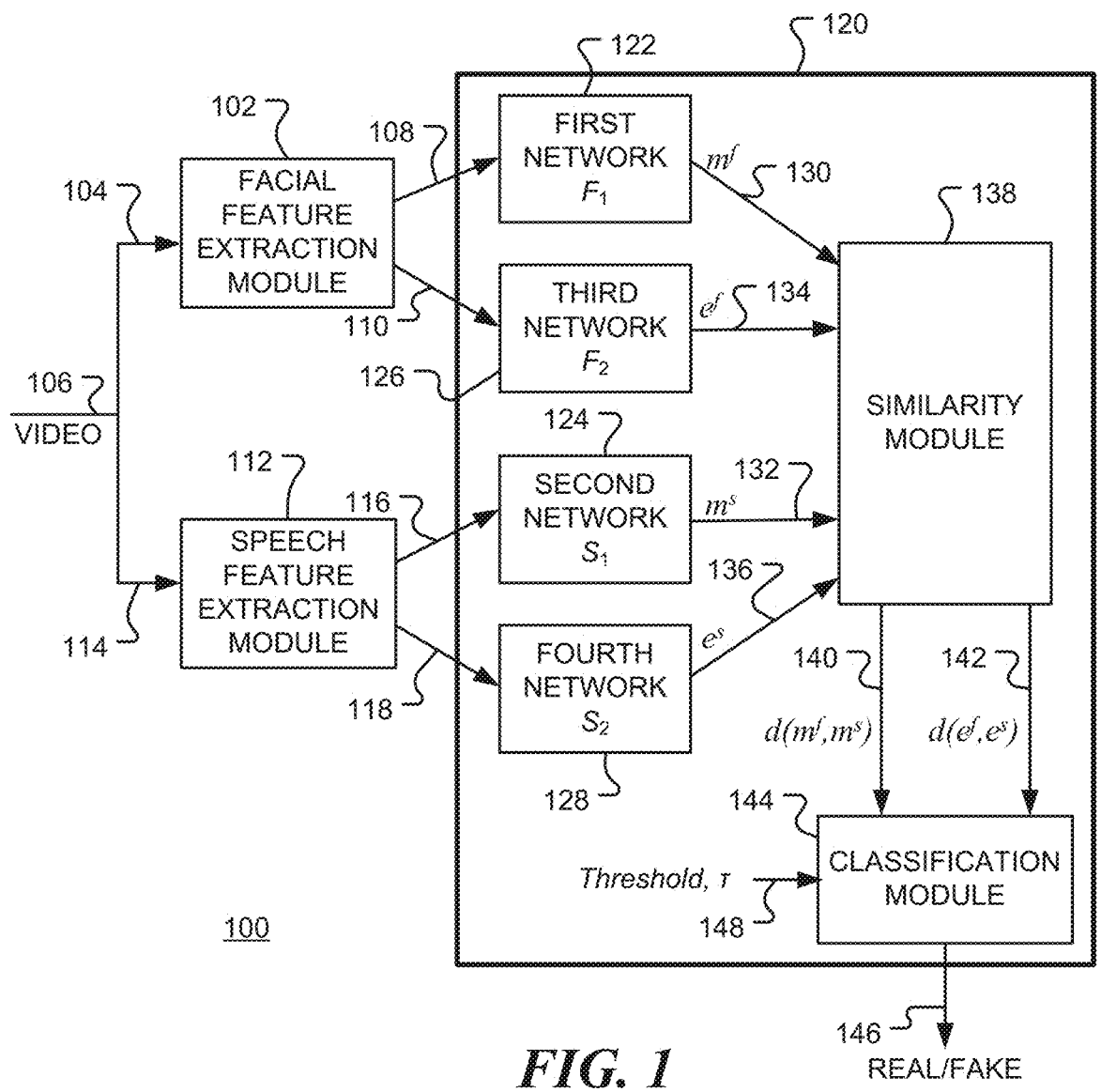
FIG. 1 is a block diagram of a system for classifying videos as real or fake, in accordance with various representative embodiments.

The various apparatus and devices described herein provide mechanisms for detecting forged or fabricated videos, sometimes called "deepfakes" or simply "fakes."

While the present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar, or corresponding parts in the several views of the drawings. For simplicity and clarity of illustration, reference numerals may be repeated among the figures to indicate corresponding or analogous elements.

The presently disclosed subject matter relates generally to the detection of forged or fabricated videos, sometimes called "deepfakes." In certain embodiments, the method involves extracting the audio and video modalities from the video file. In certain embodiments, affective cues corresponding to emotions, or other feelings, are further extracted from the modalities of the audio and/or the video. In certain embodiments, the information extracted from the various modalities across the audio and the video are used to determine whether the video is a fake video. In certain embodiments, a deep learning network system is utilized to extract the information used to assess the comparison. In certain embodiments, the system may be trained to improve efficiency and/or accuracy.

In certain embodiments, modalities such as facial cues, speech cues, background context, hand gestures, and body posture and orientation are extracted from a video. When combined, multiple cues or modalities can be used to detect whether a given video is real or fake.

In accordance with the present disclosure, deepfake detection is achieved by exploiting the relationship between the visual and audio modalities extracted from the same video.

Prior studies, in both psychology literature and multimodal machine learning literature, have shown evidence of a strong correlation between different modalities of the same subject. More specifically, some positive correlation has been suggested between audio-visual modalities. This correlation has been exploited for multimodal perceived emotion recognition. For instance, it has been suggested that when different modalities are modeled and projected into a common space, they should point to similar affective cues. Affective cues are specific features that convey rich emotional and behavioral information to human observers and help them distinguish between different perceived emotions. These affective cues include various positional and movement features, such as dilation of the eye(s), raised eyebrows, volume, pace, and tone of the voice. The present disclosure exploits the correlation between modalities and affective cues to classify "real" and "fake" videos.

Various embodiments of the disclosure relate to a technique that simultaneously exploits the audio (e.g., speech) and visual (e.g., face) modalities, and the perceived emotion features extracted from both the modalities, to detect any falsification or alteration in the input video. To model these multimodal features and the perceived emotions, the disclosed learning method uses a Siamese network-based architecture. At training time, a real video, along with its deepfake, are passed through a network to obtain modality and perceived emotion embedding vectors for the face and speech of the subject. These embedding vectors are used to compute a triplet loss function that is, in turn, used to minimize the similarity between the modalities from the fake video and maximize the similarity between modalities for the real video. The approach uses a deep learning approach to model the similarity (or dissimilarity) between the facial and speech modalities, extracted from the input video, to perform deepfake detection. In addition, affect information, i.e., perceived emotion cues from the two modalities, is used to detect the similarity (or dissimilarity) between modality signals. The perceived emotion information helps in detecting deepfake content. The facial and speech modalities may be obtained by extracting them from an input video as needed, or by retrieving previously extracted modalities stored in local or remote memory.

In accordance with certain embodiments, a training method is disclosed in which facial and speech features are extracted from raw videos in a training dataset. Each subject in the dataset has a pair of videos; one real and one fake. For example, the facial features could be extracted using the "OpenFace" application and speech features extracted using the "pyAudioAnalysis" application. The extracted features are passed to a training network that consists of two modality embedding networks and two perceived emotion embedding networks.

FIG. 1 is a block diagram of a system 100 for classifying videos as real or fake, in accordance with various representative embodiments. The system implements a multimodal approach to detecting deepfake videos. System 100 includes first feature extraction module 102, second feature extraction module 112 and neural network 120. First feature extraction module 102 and second feature extraction module 112 may be computer software (e.g., computer-readable instructions, computer-executable instructions, software modules, etc.) that are executed by one or more processors, or hardware modules that include particularly programmed or configured circuitry such as, for example, field-programmable gate arrays (FPGAs), application-specific integrated circuits (ASICs), etc. Similarly, neural network 120 may be executed by one or more processors, or by particularly programmed or configured circuitry, such as, for example, field programmable gate arrays (FPGAs), application specific integrated circuits (ASICs), etc.

In an embodiment, first feature extraction module 102 is configured to receive visual content 104 of a video 106 and produce facial features therefrom, the facial features including facial modalities 108 and facial affective cues 110. Second feature extraction module 112 configured to receive audio content 114 of the video 106 and produce speech features therefrom, the speech features including speech modalities 116 and speech affective cues. Neural network 120 includes first network 122 ($F_1$), second network 124 ($S_1$), third network 126 ($F_2$) and fourth network 128 ($S_2$).

In an embodiment, first network 122 is responsive to the facial modalities 108 and is configured to produce a facial modality embedding 130 of the facial modalities. Second network 124 is responsive to the speech modalities 116 and is configured to produce a speech modality embedding 132 of the speech modalities. Third network 126 is responsive to the facial affective cues 110 and is configured to produce an embedding 134 of the facial affective cues. Fourth network 128 is responsive to the speech affective cues 118 and configured to produce an embedding 136 of the speech affective cues.

The approach is similar to a Siamese Network architecture and produces both modality embeddings and perceived emotion embedding. The neural network 120 may be trained using a modified triplet loss metric, for example.

Embeddings 130, 132, 134, and 136 are compared using a similarity score. In the embodiment shown, neural network 120 includes a similarity or comparison module 138 configured to determine a first measure of a similarity 140, between the facial modality embedding 130 and the speech modality embedding 132, and a second measure of a similarity 142, between the embedding 134 of the facial affective cues and the embedding 136 of the speech affective cues.

Neural network 120 also includes classification module 144 configured to determine the input video 106 to be real or fake dependent upon the first and second measures of similarity. Classification module 144 outputs a label 146 indicating if the video is classified as real or fake. The classification may be based upon a threshold value 148, determined during training of the neural network.

Figure 2:
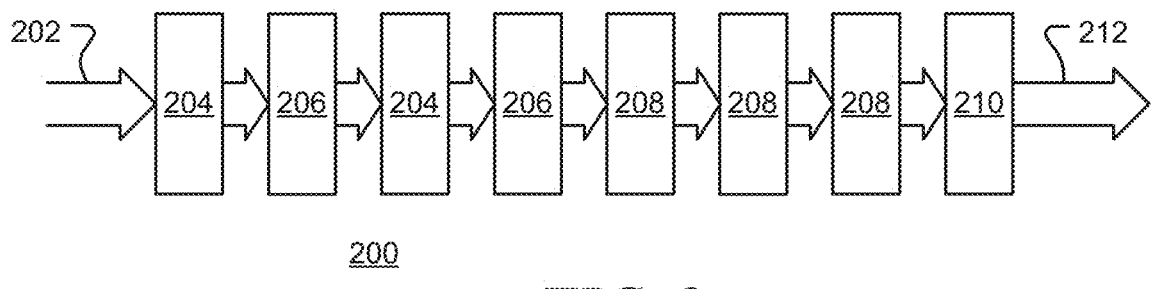
FIG. 2 is a block diagram of a component network of a system for classifying videos as real or fake, in accordance with various representative embodiments.

FIG. 2 is a block diagram of a component network 200 of a system for classifying videos as real or fake, in accordance with various representative embodiments. Network 200 receives modalities 202 and consists of two-dimensional (2D) convolutional layers 204, max-pooling layers 206, fully-connected layers 208, and normalization layers 210. Network 200 outputs a modality embedding vector 212. The first and second networks, $F_1$ and $S_1$, may be implemented using component network 200. This approach embeds facial and speech modalities into a common vector space, thereby enabling comparison of the modalities. It will be apparent, to those of skill in the art, that variations of component network 200, in the type and number of layers used, may be used without departing from the present disclosure.

Figure 3:
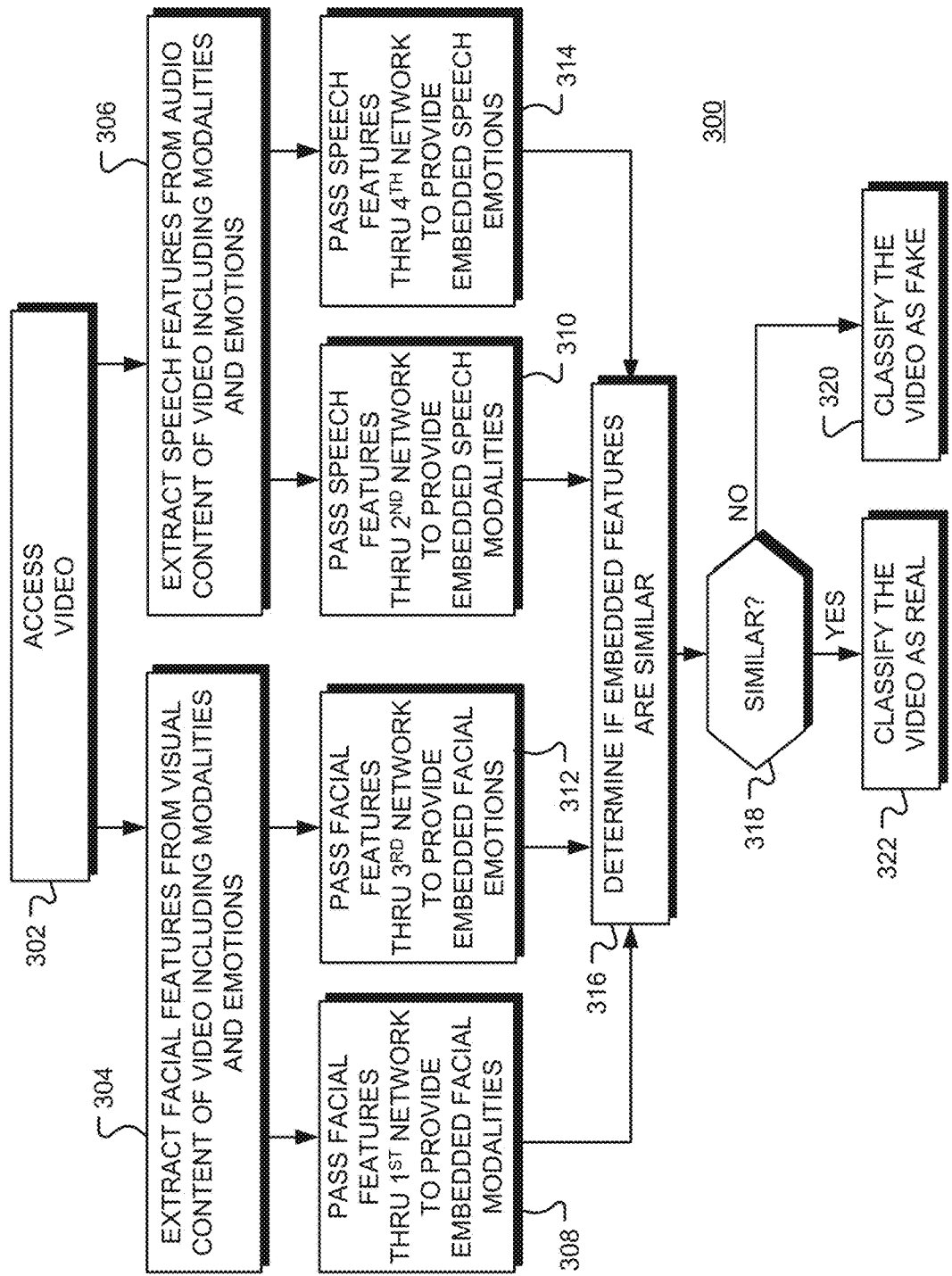
FIG. 3 is a flow chart of a method for classifying videos as real or fake, in accordance with various representative embodiments.

FIG. 3 is a flow chart 300 of a method for classifying videos as real or fake, in accordance with representative embodiments of the disclosure. A video to be classified is accessed at block 302. The video may be obtained from memory or via a network, for example. Facial features are extracted from visual content of the video at block 304, the facial features including facial modalities and facial emotions. Speech features are extracted from audio content of the video at block 306, the speech features including speech modalities and speech emotions. At block 308, the facial modalities are passed through a first neural network ($F_1$) to generate a facial modality embedding ($m^f$) of the facial modalities and, at block 310, the speech modalities are passed through a second neural network ($S_1$) to generate a speech modality embedding ($m^s$) of the speech modalities. At block 312, the facial emotions are passed through a third neural network ($F_2$) to generate a facial emotion embedding ($e^f$) of the facial emotions and, at block 314, the speech emotions are passed through a fourth neural network ($S_2$) to generate a speech emotion embedding ($e^s$) of the speech emotions. At block 316 it is determined if the embedded modalities and emotions are similar. This may be done, for example, by generating a first distance $d_1(m^f, m^s)$ between the facial modality embedding and the speech modality embedding and generating a second distance $d_2$ ($e^f, e^s$) between the facial emotion embedding and the speech emotion embedding. When a sum of the first distance and the second distance exceeds a threshold distance the facial and speech embedding are considered dissimilar, as depicted by the negative branch from decision block 318, and the video is classified as fake at block 320. Conversely, when the sum of the first distance and the second distance does not exceed the threshold distance, the facial and speech embedding are considered similar, as depicted by the positive branch from decision block 318, and the video is classified as real at block 322.

The facial modalities may include two-dimensional landmark positions, head pose orientation, and/or gaze, or any combination thereof.

While the embodiment in FIG. 3 uses perceived emotions, the disclosure is not so limited, and other affective cues, such as pain or stress for example, could be identified.

As described below, the approach has been validated on two benchmark deepfake detection datasets: the DeepFakeTIMIT dataset, and the DFDC dataset. The Area-Under-Curve (AUC) metric is calculated for the two datasets and compared with several prior works. The AUC metric is the area under the Receiver Operating Characteristic (ROC) curve. The ROC plots the true positive rate against the false-positive rate. In one embodiment, a per-video AUC score of 84.4% is achieved, which is an improvement of about 9% over prior methods on the DFDC dataset. In addition, the approach performs at-par with prior methods on the DF-TIMIT dataset.

Most prior works in deepfake detection decompose videos into frames and explore visual artifacts across frames. For instance, one technique uses a Deep Neural Network (DNN) to detect fake videos based on artifacts observed during the face warping step of the generation algorithms. Similarly, other techniques look at inconsistencies in the head poses in the synthesized videos or capture artifacts in the eyes, teeth, and facial contours of the generated faces. Prior works have also experimented with a variety of network architectures. For example, prior works have used capsule structures, the "XceptionNet," or a two-stream Convolutional Neural Network (CNN) to achieve state-of-the-art performance in general-purpose image forgery detection. Previous researchers have also exploited the observation that temporal coherence is not always enforced effectively in the synthesis process of deepfakes. For instance, the use of spatio-temporal features of video streams has been leveraged to detect deepfakes. Likewise, since a deepfake video may contain intra-frame inconsistencies, a convolutional neural network with a Long Short Term Memory (LSTM) has been used to detect deepfake videos.

In certain embodiments of the disclosure, the audio and video modalities and affective cues corresponding to emotions are extracted from the audio and visual content of a video. The modalities and affective cues are input to a neural network. The neural network system may be trained to improve efficiency and/or accuracy using benchmark data sets, for example.

A number of datasets of real and fake videos are available; some are listed in Table 1.

TABLE 1

| Dataset | Released | Number of Videos | | | Video Source | | Modes | |
|---|---|---|---|---|---|---|---|---|
| | | Real | Fake | Total | Real | Fake | Visual | Audio |
| UADFV | November 2018 | 49 | 49 | 98 | YouTube | FakeApp | ✓ | ✗ |
| DF-TIMIT | December 2018 | 0 | 620 | 620 | VidTIMIT | FS_GAN | ✓ | ✓ |
| Face Forensics++ | January 2019 | 1,000 | 4,000 | 5,000 | YouTube | FS, DF | ✓ | ✗ |
| DFD | September 2019 | 361 | 3,070 | 3,431 | YouTube | DF | ✓ | ✗ |
| CelebDF | November 2019 | 408 | 795 | 1,203 | YouTube | DF | ✓ | ✗ |
| DFDC | October 2019 | 19,154 | 99,992 | 119,146 | Actors | Unknown | ✓ | ✓ |
| Deeper Forensics 1.0 | January 2020 | 50,000 | 10,000 | 60,000 | Actors | DF | ✓ | — |

Of these datasets, only the DF-TIMIT and DFDC datasets contain both audio and visual content. These datasets were used to train an example neural network to produce the results presented below.

While prior unimodal deepfake detection methods have focused only on the facial features of the subject, there has not been much focus on using the multiple modalities that are part of the same video. One approach is to use a Siamese-based network to detect the fake videos generated from the neural talking head models. This approach performs a classification based on distance. However, the two inputs to the Siamese network are a real and fake video. Another approach analyzes lip-syncing inconsistencies using two channels, the audio and visual of moving lips. A still further approach investigates the problem of detecting deception in real-life videos, which is very different from deepfake detection. This approach uses a multilayer perceptron (MLP) based classifier combining video, audio, and text with micro-expression features. In contrast, examples disclosed herein exploit the mismatch between at least two different modalities.

The problem of deepfake detection has received considerable and increasing attention, and this research has been stimulated with many datasets, some of which are presented in Table 1. The DFDC and Deeper Forensics 1.0 datasets are larger and do not disclose details of the AI model used to synthesize the fake videos from the real videos. Also, the DFDC dataset is the only dataset that contains a mixture of videos with manipulated faces, audio, or both. All the other datasets contain only manipulated faces. Furthermore, only DFDC and DF-TIMIT contain both audio and video, allowing analysis of both modalities.

It has been reported that even if two modalities representing the same emotion vary in terms of appearance, the features detected are similar and should be correlated. Hence, if projected to a common space, they are compatible and can be fused to make inferences. Exploration of the relationship between visual and auditory human modalities, reported in the neuroscience literature, suggests that the visual and auditory signals are coded together in small populations of neurons within a particular part of the brain. Researchers have explored the correlation of lip movements with speech. Studies concluded that our understanding of the speech modality is greatly aided by the sight of the lip and facial movements. Subsequently, such correlation among modalities has been explored extensively to perform multi-modal emotion recognition. These studies have suggested and shown correlations between affect features obtained from the individual modalities (e.g., face, speech, eyes, gestures). For instance, one study proposes a multimodal perceived emotion perception network, which uses the correlation among modalities to differentiate between effectual and ineffectual modality features. The disclosed approach is motivated by these developments in psychology research.

Table 2 summarizes the notations used herein.

TABLE 2

| Symbol | Description |
| --- | --- |
| $x_y$ | $x \in \{f, s\}$ denote face and speech features extracted from OpenFace and pyAudioAnalysis. $y \in \{real, fake\}$ indicate whether the feature x is real or fake. E.g. $f_{real}$ denotes the face features extracted from a real video using OpenFace. |
| $a_c^b$ | $a \in \{e, m\}$ denote emotion embedding and modality embedding. $b \in \{f, s\}$ denote face and speech cues. $c \in \{real, fake\}$ indicate whether the embedding a is real or fake. E.g. $m_{real}^f$ denotes the face modality embedding generated from a real video. |
| $\rho_1$ | Modality Embedding Similarity Loss (Used in Training) |
| $\rho_2$ | Emotion Embedding Similarity Loss (Used in Training) |
| $d_m$ | Face/Speech Modality Embedding Distance (Used in Testing) |
| $d_e$ | Face/Speech Emotion Embedding Distance (Used in Testing) |

As described above, given an input video with audio and visual modalities present, the goal of the disclosed system is to determine if the video is a deepfake video or a real video. During training, one "real" and one "fake" video are selected, both containing the same subject. The visual face features $f_{real}$ and the speech features $s_{real}$ are extracted from the real input video. In a similar fashion, the face feature $f_{fake}$ and speech features $s_{fake}$ are extracted from the fake video. The face and speech features may be extracted using the applications "OpenFace" and "pyAudioAnalysis", respectively, for example. The extracted features, $f_{real}$, $s_{real}$, $f_{fake}$, $s_{fake}$ form the inputs to the networks ($F_1$, $F_2$, $S_1$ and $S_2$). These networks are trained using a combination of two triplet loss functions designed using the similarity scores, denoted by $\rho_1$ and $\rho_2$. Similarity score $\rho_1$ represents similarity among the facial and speech modalities, while $\rho_2$ is the similarity between the affect cues (specifically, perceived emotion) from the modalities of both real and fake videos.

The training method is similar to a Siamese network in that the same weights of the network ($F_1$, $F_2$, $S_1$, $S_2$) are used to operate on two different inputs, one real video and the other a fake video of the same subject. However, unlike regular classification-based neural networks, which perform classification and propagate that loss back, similarity-based metrics are used for distinguishing the real and fake videos.

In some embodiments, this similarity between these modalities is modeled using Triplet loss, as discussed below.

During testing, the face and speech feature vectors, f and s, respectively, are extracted from a given input video. The face features, f are passed into $F_1$ and $F_2$, and the speech features s are passed into $S_1$ and $S_2$, where $F_1$, $F_2$, $S_1$, and $S_2$ are used to compute distance metrics, $dist_1$ and $dist_2$. A threshold $\tau$, learned during training, is used to classify the video as real or fake.

The first and second networks, $F_1$ and $S_1$ are neural networks that are used to learn the unit-normalized embeddings for the face and speech modalities, respectively. FIG. 2, described above, shows an embodiment of the networks $F_1$ and $S_1$ used in both training and testing routines. They comprise 2D convolutional layers (204), max-pooling layers (206), and fully connected layers (208). ReLU non-linearity is used between all layers. The last layer is a unit-normalization layer (210). In one embodiment, both face and speech modalities, $F_1$ and $S_1$ return 250-dimensional unit-normalized embeddings.

Figure 4:
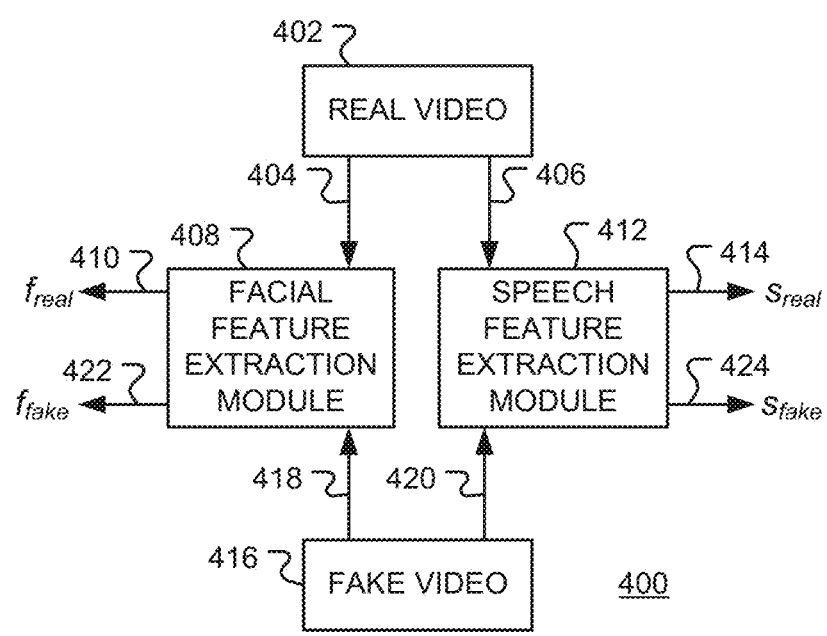
FIG. 4 is a block diagram of a feature extraction module used in training a neural network, in accordance with various representative embodiments.

FIG. 4 is a block diagram of a feature extraction module 400 used in training, in accordance with various representative embodiments. Real video(s) 402 from a training dataset include both visual content 404 and audio content 406. The visual content is passed to facial feature extraction module 408, which produces facial features 410 ($f_{real}$) of the real video. The audio content 406 of the video is passed to speech feature extraction module 412, which produces speech features 424 ($s_{real}$) of the real video.

Fake video(s) 416 of the same subjects in the training dataset also include both visual content 418 and audio content 420. The visual content 418 is passed to facial feature extraction module 408, which produces facial features 422 ($f_{fake}$) of the fake video. The audio content 420 of the fake video is passed to speech feature extraction module 412, which produces speech features 414 ($s_{fake}$) of the fake video.

Figure 5:
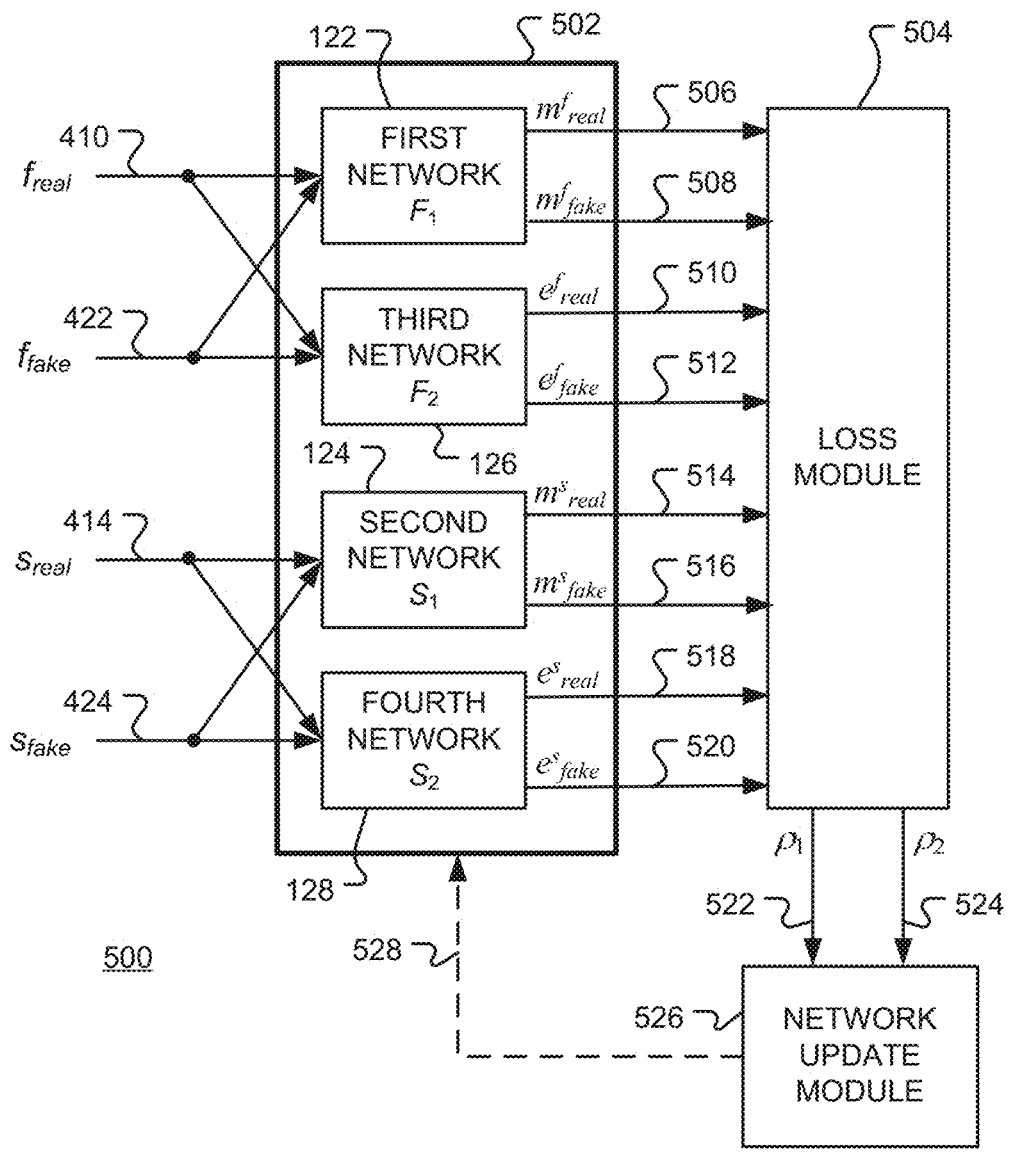
FIG. 5 is a block diagram of a system for training a neural network, in accordance with various representative embodiments.

FIG. 5 is a block diagram of a system 500 for training neural network 502, in accordance with various representative embodiments. The system includes a loss module 504 for evaluating performance of the network.

The training is performed using the following equations:

$$m_{real}^f = F_1(f_{real}), \; m_{fake}^f = F_1(f_{fake})$$

$$m_{real}^s = S_1(s_{real}), \; m_{fake}^s = S_1(s_{fake}) \quad (1)$$

The facial features $f_{real}$ (410) of the real videos and the facial features $f_{fake}$ of the fake videos are passed to first network 122 to provide facial modality embedding vectors $m_{real}^f$ (506) and $m_{fake}^f$ (508), respectively. The facial features $f_{real}$ (410) of the real videos and the facial features $f_{fake}$ of the fake videos are also passed to third network 126 to provide facial emotion embedding vectors $e_{real}^f$ (510) and $e_{fake}^f$ (512), respectively.

Similarly, the speech features $s_{real}$ (414) of the real videos and the speech features $s_{fake}$ of the fake videos are passed to second network 124 to provide speech modality embedding vectors $m_{real}^s$ (514) and $m_{fake}^s$ (516), respectively. The speech features $s_{real}$ (414) of the real videos and the speech features $s_{fake}$ (424) of the fake videos are also passed to fourth network 128 to provide speech emotion embedding vectors $e_{real}^s$ (518) and $e_{fake}^s$ (520), respectively.

Testing is performed using the equations:

$$m^f = F_1(f), \; m^s = S_1(s) \quad (2)$$

The networks $F_2$ and $S_2$ are used to learn the unit-normalized affect embeddings for the face and speech emotions, respectively. In one embodiment, $F_2$ and $S_2$ are based on the Memory Fusion Network (MFN), which is reported to have good performance on both emotion recognition from multiple views or modalities, such as face and speech. An MFN is based on a recurrent neural network architecture with three main components: a system of LSTMs, a Memory Attention Network, and a Gated Memory component. The system of LSTMs takes in different views of the input data. Various embodiments of the disclosure adopt the trained single-view version of the MFN, where the face and speech are treated as separate views, e.g., $F_2$ takes in the video (view only) and $S_2$ takes in the audio (view only). In the example results presented below, the $F_2$ MFN is pre-trained with video from the CMU-MOSEI dataset and the $S_2$ MFN is pre-trained with corresponding audio. The CMU-MOSEI dataset describes the perceived emotion space with six discrete emotions following the Ekman model: "happy", "sad", "angry", "fearful", "surprise", and "disgust", and a "neutral" emotion to denote the absence of any of these emotions. For the example results, the face and speech modalities use 250-dimensional unit-normalized features constructed from the cross-view patterns learned by $F_2$ and $S_2$ respectively.

The training is performed using the following equations:

$$e_{real}^f = F_2(f_{real}),\ e_{fake}^f = F_2(f_{fake})$$

$$e_{real}^s = S_2(s_{real}),\ e_{fake}^s = S_2(s_{fake}) \quad (3)$$

Testing is performed using the equations:

$$e^f = F_2(f),\ e^s = S_2(s) \quad (4)$$

To train the networks, a fake and a real video with the same subject are used as the input. After passing extracted features from raw videos ($f_{real}$, $f_{fake}$, $s_{real}$, $s_{fake}$) through $F_1$, $F_2$, $S_1$ and $S_2$, the unit-normalised modality and perceived emotion embeddings are obtained, as described in Eqs. 1-4, above.

For input real and fake videos, first $f_{real}$ is compared with $f_{fake}$, and $s_{real}$ is compared with $s_{fake}$ to determine which modality was manipulated more in the fake video. When the face modality is determined to be manipulated more in the fake video, based on these embeddings, the first similarity between the real and fake speech and face embeddings is computed as follows:

$$\text{Similarity Score 1: } L_1 = d(m_{real}^s, m_{real}^f) - d(m_{real}^s, m_{fake}^f) \quad (5)$$

where d denotes the Euclidean distance.

In simpler terms, $L_1$ is the difference between the pair of distances $d(m_{real}^s, m_{real}^f)$ and $d(m_{real}^s, m_{fake}^f)$. It is expected that the embedding vectors $m_{real}^s, m_{real}^f$ will be closer to each other than the vectors $m_{real}^s, m_{fake}^f$, since one results from a fake face modality. The training seeks to maximize this difference. To use this correlation metric as a loss function to train the model, the difference may be formulated using the notation of Triplet Loss:

$$\text{Similarity Loss 1: } \rho_1 = \max(L_1 + m_1, 0) \quad (6)$$

where $m_1$ is the margin used for convergence of training.

If it is determined that speech is the more manipulated modality in the fake video, the similarity score is formulated as:

$$L_1 = d(m_{real}^f, m_{real}^s) - d(m_{real}^f, m_{fake}^s) \quad (7)$$

Similarly, a second similarity is computed as the difference in affective cues extracted from the modalities from both real and fake videos. This is denoted as:

$$L_2 = d(e_{real}^s, e_{fake}^s) - d(e_{real}^s, e_{fake}^f) \quad (8)$$

As per prior psychology studies, it is expected that similar un-manipulated modalities point towards similar affective cues. Hence, because the input here has a manipulated face modality, it is expected that $e_{real}^s, e_{fake}^s$ will be closer to each other than to $e_{real}^s, e_{fake}^f$. To use this as a loss function, this is again formulated using a Triplet loss:

$$\text{Similarity Loss 2: } \rho_2 = \max(L_2 + m_2, 0) \quad (9)$$

where $m_2$ is the margin.

Again, if speech was the more highly manipulated modality in the fake video, $L_2$ is formulated as:

$$L_2 = d(e_{real}^f, e_{fake}^f) - d(e_{real}^f, e_{fake}^s) \quad (10)$$

Both of the similarity losses are used as the cumulative loss that is propagated back into the network.

$$\text{Loss} = \rho_1 + \rho_2 \quad (11)$$

Figure 6A:
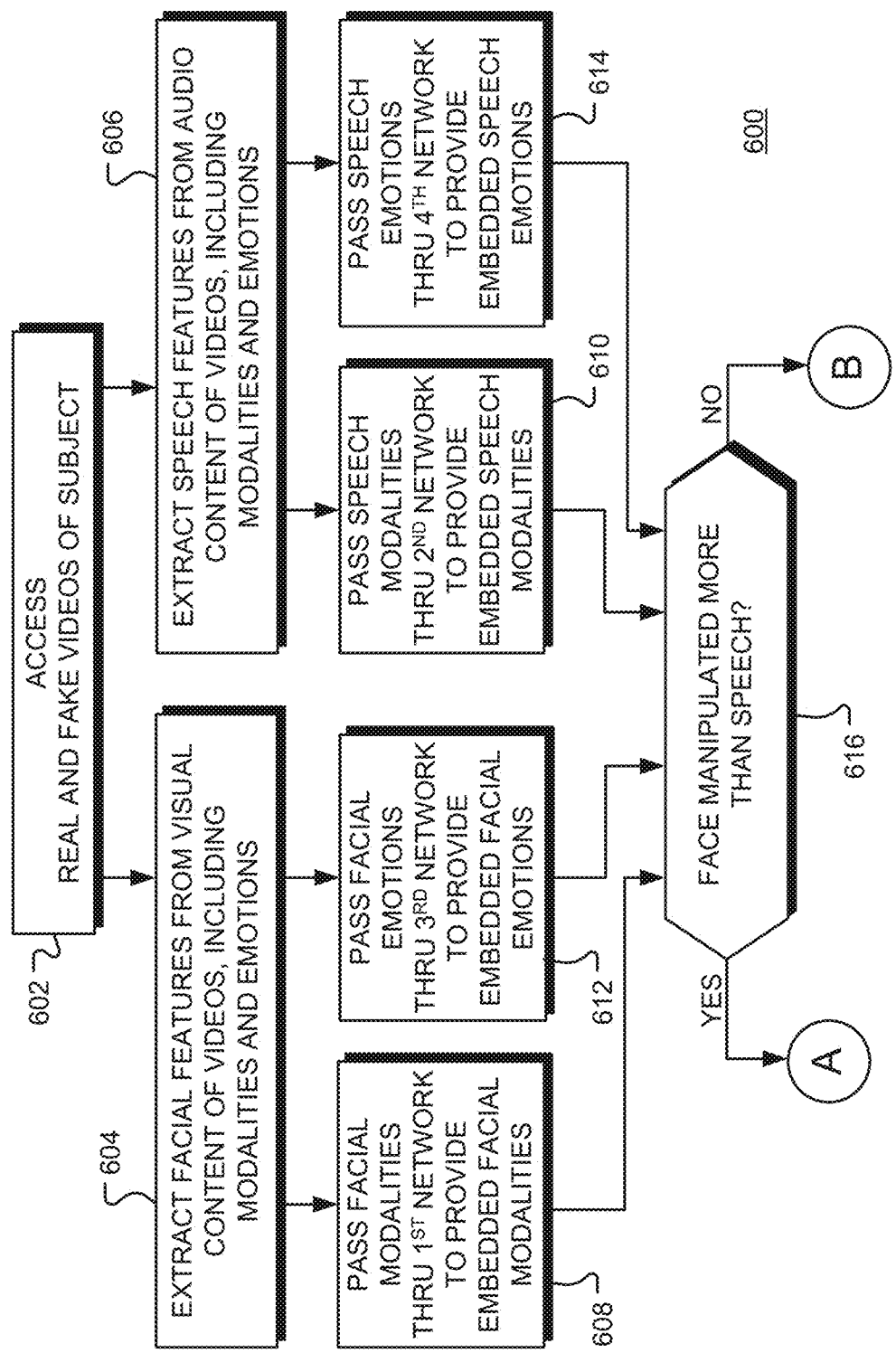
FIGS. 6A, 6B show a flow chart of a method for training a neural network to classify a video as real or fake, in accordance with various representative embodiments.
Figure 6B:
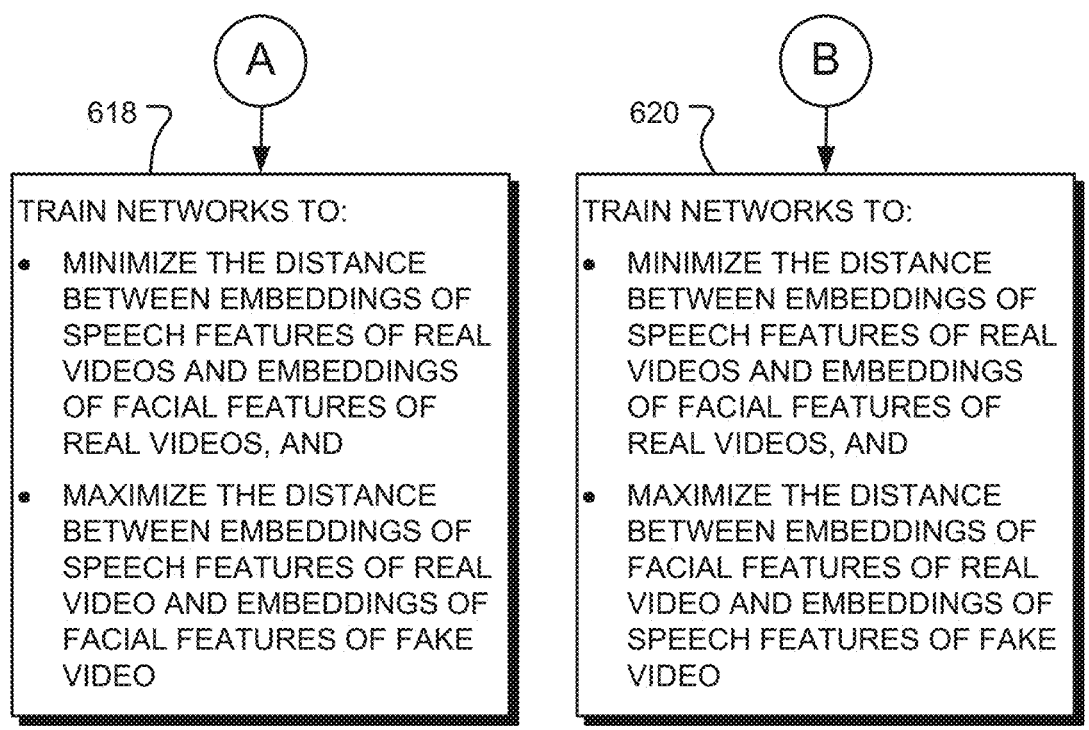

FIGS. 6A and 6B show a flow chart of a method 600 for training a neural network to classify a video as real or fake, in accordance with various representative embodiments. Referring first to FIG. 6A, the method includes accessing real and fake videos of a first subject at block 602, extracting facial features from visual content of the real and fake videos at block 604, and extracting speech features from audio content of the real and fake videos at block 606. The facial features include both facial modalities and facial emotions, while the speech features include both speech modalities and speech emotions. The facial modalities are passed through the first network at block 608 to produce one or more facial modality embeddings, $m_{real}^f$ and $m_{fake}^f$, of the real and fake videos, respectively. The speech modalities are passed through the second network at block 610 to produce speech modality embeddings, $m_{real}^s$ and $m_{fake}^s$, of the real and fake videos, respectively.

Similarly, the facial emotions are passed through the third network at block 612 to produce facial emotion embeddings $e_{real}^f$ and $e_{fake}^f$, of the real and fake videos, respectively. The speech emotions are passed through the fourth network at block 614 to produce speech emotion embeddings, $e_{real}^s$ and $e_{fake}^s$, of the real and fake videos, respectively.

At decision block 616, it is determined whether the facial features in the fake video have been manipulated more than the speech features. If so, as depicted by the positive branch from decision block 616, flow continues to point "A" in FIG. 6B. If, on the other hand, the facial features in the fake video have been manipulated less than the speech features, as depicted by the negative branch from decision block 616, flow continues to point "B" in FIG. 6B.

FIG. 6B shows a continuation of the flow chart shown in FIG. 6A. If it is determined that the facial features in the fake video have been manipulated more than the speech features, flow starts at point "A". At block 618 the networks are trained to minimize the distance between embeddings of the speech features of the real videos and the facial features of the real videos and to maximize the distance between embeddings of the speech features of the real video and embeddings of the facial features of the fake video.

If, on the other hand, the facial features in the fake video have been manipulated less than the speech features, flow starts at point "B". At block 620, the networks are trained to minimize the distance between embeddings of the speech features of the real videos and the facial features of the real videos and to maximize the distance between embeddings of the facial features of the real video and embeddings of the speech features of the fake video.

To label a single input video as real or fake, the features, f and s are extracted from the raw video and the features are passed through the networks $F_1$, $F_2$, $S_1$ and $S_2$ to obtain modality and perceived emotion embeddings.

To classify the video as real or fake, the following two distance values are computed:

Distance 1: $d_m = d(m^f, m^s)$

Distance 2: $d_e = d(e^f, e^s)$ \hfill (12)

To distinguish between real and fake, $d_m$ and $d_e$ are compared with a threshold, $\tau$, that is empirically learned during. Thus, if $$d_m + d_e > \tau \quad (13)$$

then the video may be classified as a fake video.

In one embodiment, to determine a value for the threshold, $\tau$, the best-trained model is used and run on the training set. The distances $d_m$ and $d_e$ are computed for both real and fake videos of the training set. These values are then averaged and find an equidistant number, which serves as a good threshold value. Experiments indicate that the computed value of $\tau$ does not vary much between datasets.

An embodiment of the neural network has been implemented and evaluated. Experiments were performed using the DF-TIMIT and DFDC datasets, which contain modalities for both face and speech features. The entire DF-TIMIT dataset was used. In addition, 18,000 videos were selected from the DFDC dataset. Eighty-five percent (85%) of the datasets were used for training 15% for testing.

On the DFDC Dataset, the networks were trained with a batch size of 128 for 500 epochs. Due to the significantly smaller size of the DF-TIMIT dataset, a batch size of 32 was used and it was trained for 100 epochs. An "Adam" optimizer was used with a learning rate of 0.01. All of the results were generated on a graphics processing unit, such as, for example, an NVIDIA® GeForce® GTX 1080 Ti graphics processing unit, etc.

First, the face and speech features were extracted from the real and fake input videos using state of the art methods. In particular, the OpenFace application was used to extract 430-dimensional facial features, including the 2D landmarks positions, head pose orientation, and gaze features. Speech features were extracted using the pyAudioAnalysis application. The speech features included 13 Mel Frequency Cepstral Coefficients (MFCC) speech features. Prior works that use audio or speech signals for various tasks like perceived emotion recognition, and speaker recognition generally utilize MFCC features to analyze audio signals.

The results reported below compare per-video AUC scores of our method against nine prior deepfake video detection methods on DF-TIMIT and DFDC. The AUC score is a measure of the accuracy of the classifier. To ensure a fair evaluation, while the subset of DFDC dataset used to train and test the nine methods is unknown, 18,000 samples were selected at random for the comparison. Moreover, as per the nature of the approaches, the prior nine methods report per-frame AUC scores. The results are summarized in Table 3. The following are the prior methods used to compare the performance of our approach on the same datasets:

Two-stream uses a two-stream CNN to achieve SOTA performance in image-forgery detection. They use standard CNN network architectures to train the model.

MesoNet is a CNN-based detection method that targets the microscopic properties of images. AUC scores are reported on two variants.

HeadPose captures inconsistencies in headpose orientation across frames to detect deepfakes.

FWA uses a CNN to expose the face warping artifacts introduced by the resizing and interpolation operations.

VA focuses on capturing visual artifacts in the eyes, teeth and facial contours of synthesized faces. Results have been reported on two standard variants of this method.

Xception is a baseline model trained on the FaceForensics++ dataset based on the XceptionNet model. AUC scores have been reported on three variants of the network.

Multi-task uses a CNN to simultaneously detect manipulated images and segment manipulated areas as a multi-task learning problem.

Capsule uses capsule structures based on a standard DNN.

DSP-FWA is an improved version of FWA with a spatial pyramid pooling module to better handle the variations in resolutions of the original target faces.

TABLE 3

| Set Number | Methods | Datasets | | |
|---|---|---|---|---|
| | | DF-TIMIT | | |
| | | LQ | HQ | DFDC |
| 1 | Capsule | 78.4 | 74.4 | 53.3 |
| 2 | Multi-task | 62.2 | 55.3 | 53.6 |
| 3 | HeadPose | 55.1 | 53.2 | 55.9 |
| 4 | Two-stream | 83.5 | 73.5 | 61.4 |
| 5 | VA-MLP | 61.4 | 62.1 | 61.9 |
| | VA-LogReg | 77.0 | 77.3 | 66.2 |
| 6 | MesoInception4 | 80.4 | 62.7 | 73.2 |
| | Meso4 | 87.8 | 68.4 | 75.3 |
| 7 | Xception-raw | 56.7 | 54.0 | 49.9 |
| | Xception-c40 | 75.8 | 70.5 | 69.7 |
| | Xception-c23 | 95.9 | 94.4 | 72.2 |
| 8 | FWA | 99.9 | 93.2 | 72.7 |
| | DSP-FWA | 99.9 | 99.7 | 75.5 |
| | Disclosed Method | 96.3 | 94.9 | 84.4 |

The embodiment of the neural network tested provides an improvement of approximately 9% over prior state-of-the-art techniques on the DFDC dataset and achieves accuracy similar to the prior state-of-the-art techniques on the DF-TIMIT dataset.

Figure 7:
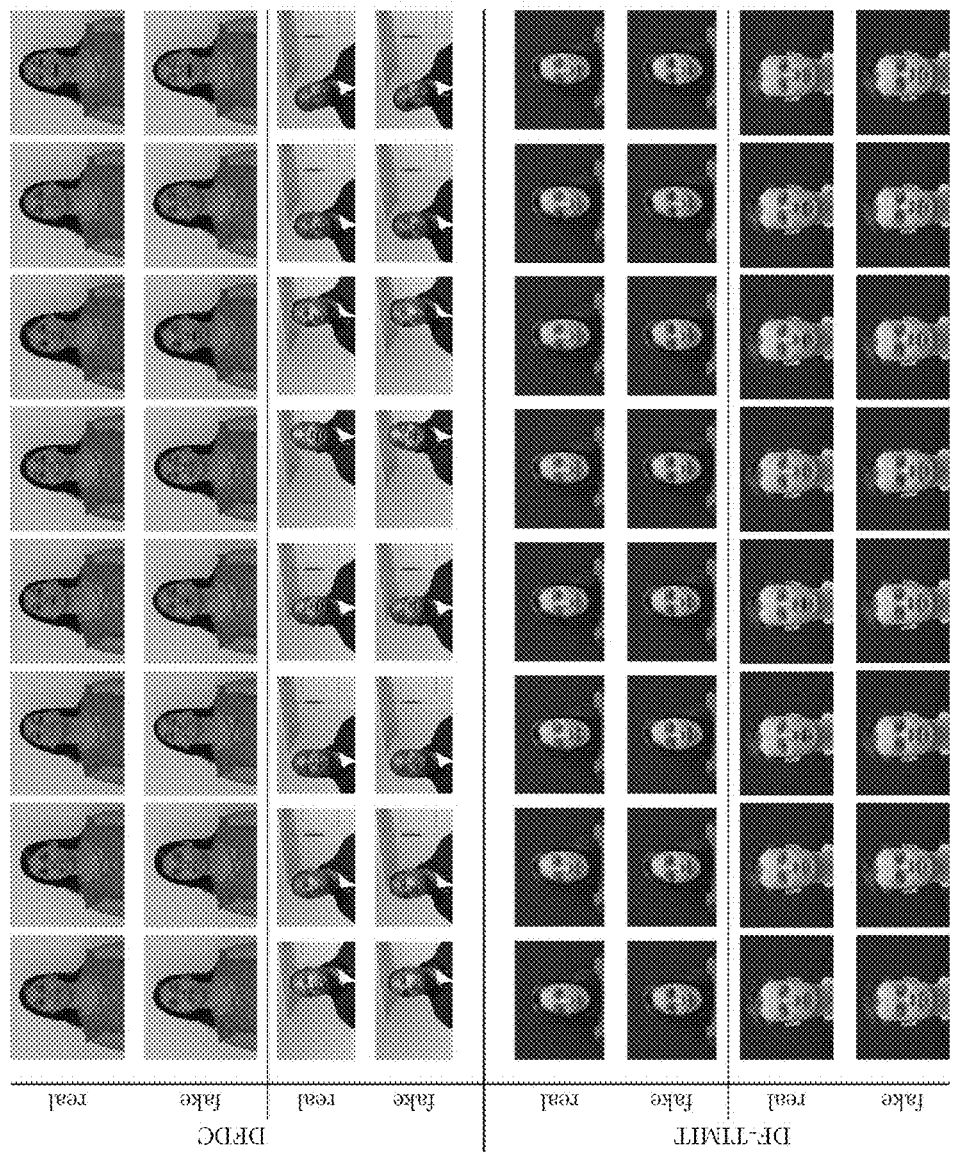
FIG. 7 shows some selected frames from both the DFDC and DF-TIMIT videos datasets.

FIG. 7 shows some selected frames from both the DFDC and DF-TIMIT datasets. The model uses the subjects' audio-visual modalities as well as their perceived emotions to distinguish between real and deepfake videos. The emotions from the speech and facial cues in fake videos are different; however in the case of real videos, the emotions from both modalities are the same. The frames are labeled as "real" or "fake."

For the qualitative results shown for DFDC, the real video predicted a "neutral" perceived emotion label for both speech and face modality, whereas in the fake video the face predicted "surprise" and speech predicted "neutral." This result is not unexpected because the fake video was generated by manipulating only the face modality and not the speech modality. A similar mismatch in perceived emotion label can be seen for the DF-TIMIT sample.

Figure 8A:
FIG. 8A shows frames from a fake video that was successfully classified as fake.
Figure 8B:
FIG. 8B shows frames from a fake video that was misclassified as real.

The model has been applied successfully to videos from outside of the datasets. For example, the model achieved reasonably good results when applied to deepfake videos collected from online social media. FIG. 8A shows frames 800 from a video that was successfully classified as fake. FIG. 8B shows frames 802 from a fake video that was misclassified. In this case, the network was unable to detect any emotion from the subject.

Figure 9:
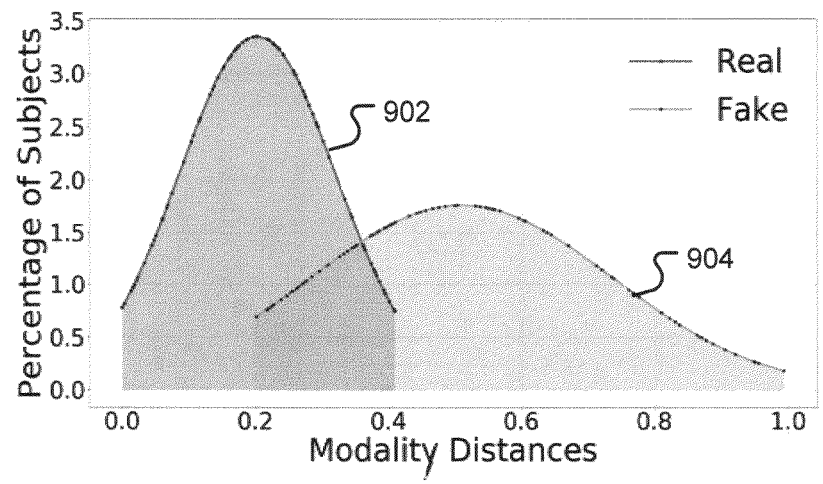
FIG. 9 is a plot of example distributions of modality embedding distances.
Figure 10:
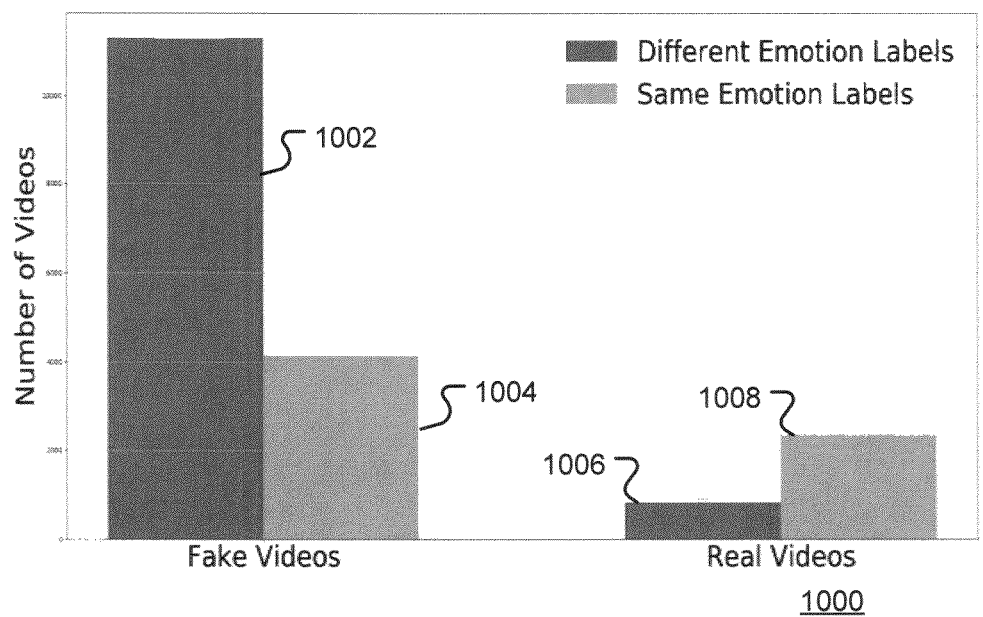
FIG. 10 is a bar graph showing the total number of videos where the perceived emotion labels, obtained from the face and speech modalities, either match or do not match.

FIG. 9 and FIG. 10 provide an intuitive interpretation of the learned embeddings from networks $F_1$, $S_1$, $F_2$, $S_2$ with visualizations. These results support the hypothesis that perceived emotions are highly correlated in real videos as compared to fake videos. The figures illustrate, for the learned embeddings, the distance between the unit-normalized face and speech embeddings learned from $F_1$ and $S_1$ on 1,000 randomly chosen points from the DFDC train set was computed.

FIG. 9 is a plot 900 of the distributions of modality embedding distances $d(m_{real}^s, m_{real}^f)$ (curve 902) and $d(m_{fake}^s, m_{fake}^f)$ (curve 904). Curve 902 shows the percentage of subject videos versus the distance between the face and speech modality embedding distances for real videos, while curve 904 shows modality embedding distances for fake videos. The distribution of real videos (curve 902) is centered around a lower modality embedding distance (0.2), while the distribution of fake videos (e.g., curve 904) is centered around a higher distance center (0.5). Thus, the audio-visual modalities are more similar in real videos as compared to fake videos.

FIG. 10 is bar graph 1000 showing the total number of videos where the perceived emotion labels, obtained from the face and speech modalities, either match or do not match. The perceived emotion labels were extracted using $F_2$ and $S_2$. Of the 15,438 fake videos analyzed, 73.2% of videos (bar 1002) were found to contain a mismatch between perceived emotion labels while 26.8% (bar 1004) contained a match. For real videos, only 24% contained a mismatch (bar 1006) while 76% (bar 1008) contained a match. This suggests that perceived emotions of subjects, from multiple modalities, are strongly similar in real videos, and often mismatched in fake videos.

As explained above, two distances, based on the modality embedding similarities and perceived emotion embedding similarities, are used to detect fake videos. To understand and motivate the contribution of each similarity, an ablation study was performed, where the model was run using only one correlation for training. Results are summarized in Table 4. The ablative studies removed one correlation at a time and recalculated the AUC scores. The results are shown in Table 4. These results confirm that the modality embedding similarity helps to achieve better AUC scores than the perceived emotion embedding similarity.

TABLE 4

| | Datasets | | |
| --- | --- | --- | --- |
| | DF-TIMIT | | |
| Methods | LQ | HQ | DFDC |
| Disclosed Method w/o Modality Similarity ($\rho_1$) | 92.5 | 91.7 | 78.3 |
| Disclosed Method w/o Emotion Similarity ($\rho_2$) | 94.8 | 93.6 | 82.8 |
| Disclosed Method | 96.3 | 94.9 | 84.4 |

The approach described above models correlation between two modalities and the associated affective cues to distinguish between real and fake modalities. However, there are multiple instances where the deepfake videos do not contain such a mismatch in terms of perceived emotional classification based on different modalities. This is also because humans express perceived emotions differently. As a result, the model fails to classify such videos as fake. Similarly, both face and speech are modalities that are easy to fake. As a result, it is possible that the method also classifies a real video as a fake video due to this mismatch.

The network, embodiments of which have been described above, uses a learning-based method for detecting fake videos. The similarity between audio-visual modalities and the similarity between the affective cues of the two modalities are used to infer whether a video is "real" or "fake." An embodiment has been evaluated using two benchmark audio-visual deepfake datasets, DFDC, and DF-TIMIT.

Further embodiments incorporate more modalities. Still further embodiments use context to infer whether a video is a deepfake or not.

The approach described herein may be combined with existing techniques for detecting visual artifacts, such as lip-speech synchronization, head-pose orientation, and specific artifacts in teeth, nose, and eyes across frames for better performance.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

As used herein, the term "configured to," when applied to an element, means that the element may be designed or constructed to perform a designated function, or that it has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special-purpose hardware and/or dedicated processors which are equivalents to the present disclosure as described and claimed. Similarly, dedicated processors and/or dedicated hard wired logic may be used to construct alternative equivalent embodiments of the present disclosure.

Various embodiments described herein are implemented using dedicated hardware, configurable hardware, or programmed processors executing programming instructions that are broadly described in flowchart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. An apparatus comprising:
    a first feature extraction module to receive visual content of a video and produce facial features therefrom, the facial features including facial modalities and facial affective cues, including facial emotions;
    a second feature extraction module to receive audio content of the video and produce speech features therefrom, the speech features including speech modalities and speech affective cues, including speech emotions;
    a neural network including:
        a first network responsive to the facial modalities to produce a facial modality embedding of the facial modalities;
        a second network responsive to the speech modalities to produce a speech modality embedding of the speech modalities;
        a third network responsive to the facial affective cues to produce an embedding of the facial affective cues, including a facial emotion embedding of the facial emotions; and
        a fourth network responsive to the speech affective cues to produce an embedding of the speech affective cues, including a speech emotion embedding of the speech emotions;
    a comparison module to determine a first measure of a similarity between the facial modality embedding and the speech modality embedding and further to determine a second measure of a similarity between the embedding of the facial affective cues and the embedding of the speech affective cues, where the first measure of the similarity comprises a first distance between the facial modality embedding and the speech modality embedding and the second measure of the similarity comprises a second distance between the embedding of the facial affective cues, including the facial emotion embedding of the facial emotions, and the embedding of the speech affective cues, including the speech emotion embedding of the speech emotions; and
    a classification module to determine the video to be real or fake dependent upon the first and second measures of similarity, where the classification module is configured to classify the video as fake when a sum of the first distance and the second distance exceeds a threshold distance and to classify the video as real when the sum of the first distance and the second distance does not exceed the threshold distance.

2. The apparatus of claim 1, where the third network includes a memory fusion network and the fourth network includes a memory fusion network.

3. The apparatus of claim 1, where the facial and speech affective cues are determined emotions, including one or more of 'happy', 'sad', 'angry', 'fearful', 'surprise', 'disgust', and 'neutral' emotions.

4. The apparatus of claim 1, where the first and second networks include one or more of:
    a two-dimensional convolution layer;
    a max-pooling layer;
    a fully-connected layer; and
    a normalization layer.

5. The apparatus of claim 1, where the first and second networks further include rectified linear unit (ReLU) activation functions implemented between layers of the networks.

6. The apparatus of claim 1, where the facial features include one or more of two-dimensional landmark positions, head pose orientation, and gaze.

7. The apparatus of claim 1, where the speech features include Mel frequency cepstral coefficients.

8. A computer-implemented method for classifying a video, the method comprising:
    obtaining facial features extracted from visual content of the video, the facial features including facial modalities and facial emotions;
    obtaining speech features extracted from audio content of the video, the speech features including speech modalities and speech emotions;
    passing the facial modalities through a first neural network ($F_1$) to generate a facial modality embedding ($m^f$) of the facial modalities;
    passing the speech modalities through a second neural network ($S_1$) to generate a speech modality embedding ($m^s$) of the speech modalities;
    passing the facial emotions through a third neural network ($F_2$) to generate a facial emotion embedding ($e^f$) of the facial emotions;
    passing the speech emotions through a fourth neural network ($S_2$) to generate a speech emotion embedding ($e^s$) of the speech emotions;
    generating a first distance $d_1(m^f, m^s)$ between the facial modality embedding and the speech modality embedding;
    generating a second distance $d_2(e^f, e^s)$ between the facial emotion embedding and the speech emotion embedding;
    classifying the video as fake when a sum of the first distance and the second distance exceeds a threshold distance; and
    classifying the video as real when the sum of the first distance and the second distance does not exceed the threshold distance.

9. The computer-implemented method of claim 8, where the facial modalities include at least one of two-dimensional landmark positions, head pose orientation, and gaze.

10. The computer-implemented method of claim 8, where the speech modalities include Mel frequency cepstral coefficients.

11. The computer-implemented method of claim 8, further comprising training the first, second, third, and fourth neural networks using real and fake videos to maximize the distance between a facial and a speech embedding of real and fake videos and minimize the distance between a facial and a speech embedding of real videos.

12. The computer-implemented method of claim 8, where the facial and speech emotions include one or more of 'happy', 'sad', 'angry', 'fearful', 'surprise', 'disgust', and 'neutral' emotions.

13. The computer-implemented method of claim 8, further comprising training the first, second, third, and fourth neural networks, including:
 generating, from a real video of a first subject:
  a real facial modality embedding ($m_{real}^{f}$);
  a real speech modality embedding ($m_{real}^{s}$);
  a real facial emotion embedding ($e_{real}^{f}$); and
  a real speech emotion embedding ($e_{real}^{s}$);
 generating, from a fake video of the first subject:
  a fake facial modality embedding ($m_{fake}^{f}$);
  a fake facial emotion embedding ($e_{fake}^{f}$); and
  a fake speech emotion embedding ($e_{fake}^{s}$)
 determining a first similarity loss $\rho_1 = \max(L_1 + m_1, 0)$, where:
  'max' denotes a maximum value;
  $m_1$ is a margin value;
  $L_1 = d(m_{real}^{s}, m_{real}^{f}) - d(m_{real}^{s}, m_{fake}^{f})$ is a first similarity score;
  $d(m_{real}^{s}, m_{real}^{f})$ is a distance between the real speech embedding ($m_{real}^{s}$) and the real facial embedding ($m_{real}^{f}$); and
  $d(m_{real}^{s}, m_{fake}^{f})$ is a distance between the real speech embedding ($m_{real}^{s}$) and the fake facial embedding ($m_{fake}^{f}$),
 determining a second similarity loss $\rho_2 = \max(L_2 + m_2, 0)$, where:
  $m_2$ is a margin value;
  $L_2 = d(e_{real}^{s}, e_{fake}^{s}) - d(e_{real}^{s}, e_{fake}^{f})$ is a second similarity score;
  $d(e_{real}^{s}, e_{fake}^{s})$ is a distance between the real speech emotion embedding ($e_{real}^{s}$) and the fake speech emotion embedding ($e_{fake}^{s}$); and
  $d(e_{real}^{s}, e_{fake}^{f})$ is a distance between the real speech emotion embedding ($e_{real}^{s}$) and the fake facial emotion embedding ($e_{fake}^{f}$); and
 adjusting the first, second, third, and fourth neural networks dependent upon a sum (L) of the first similarity loss and the second similarity loss.

14. The computer-implemented method of claim 8, further comprising training the first, second, third, and fourth, neural networks, including:
 generating, from a real video of a first subject:
  a real facial modality embedding ($m_{real}^{f}$);
  a real speech modality embedding ($m_{real}^{s}$);
  a real facial emotion embedding ($e_{real}^{f}$); and
  a real speech emotion embedding ($e_{real}^{s}$);
 generating, from a fake video of the first subject:
  a fake speech modality embedding ($m_{fake}^{s}$);
  a fake facial emotion embedding ($e_{fake}^{f}$); and
  a fake speech emotion embedding ($e_{fake}^{s}$);
 determining a first similarity loss $\rho_1 = \max(L_1 + m_1, 0)$, where:
  'max' denotes a maximum value;
  $m_1$ is a margin value;
  $L_1 = d(m_{real}^{f}, m_{real}^{s}) - d(m_{real}^{f}, m_{fake}^{s})$ is a first similarity score;
  $d(m_{real}^{f}, m_{real}^{s})$ is a distance between the real facial embedding ($m_{real}^{f}$) and the real speech embedding ($m_{real}^{s}$); and
  $d(m_{real}^{f}, m_{fake}^{s})$ is a distance between the real facial embedding ($m_{real}^{f}$) and the fake speech embedding ($m_{fake}^{s}$);
 determining a second similarity loss $\rho_2 = \max(L_2 + m_2, 0)$, where:
  $m_2$ is a margin value;
  $L_2 = (e_{real}^{f}, e_{fake}^{f}) - d(e_{real}^{f}, e_{fake})$ is a second similarity score;
  $d(e_{real}^{f}, e_{fake}^{f})$ is a distance between the real facial emotion embedding ($e_{real}^{f}$) and the fake facial emotion embedding ($e_{fake}^{f}$); and
  $d(e_{real}^{f}, e_{fake}^{s})$ is a distance between the real facial emotion embedding ($e_{real}^{f}$) and the fake speech emotion embedding ($e_{fake}^{s}$); and
 adjusting the first, second, third, and fourth neural networks dependent upon a sum (L) of the first similarity loss and the second similarity loss.

15. The computer-implemented method of claim 8, where:
 passing the facial features through the first neural network ($F_1$) to generate the facial embedding of the facial features includes passing the facial features through one or more of:
  a two-dimensional convolution layer,
  a max-pooling layer,
  a fully-connected layer, and
  a normalization layer; and
 passing the speech features through the second neural network ($S_1$) to generate the speech embedding of the speech features includes passing the speech features through one or more of:
  a two-dimensional convolution layer,
  a max-pooling layer,
  a fully-connected layer, and
  a normalization layer.

16. A computer-implemented method for training a neural network to classify a video as real or fake, the method comprising:
 for a real video of a first subject:
  obtaining facial features extracted from visual content of the real video, the facial features including facial modalities and facial emotions;
  obtaining speech features extracted from audio content of the real video, the speech features including speech modalities and speech emotions;
  passing the facial modalities through a first network of the neural network to produce a real facial modality embedding ($m_{real}^{f}$)
  passing the speech modalities through a second network of the neural network to produce a real speech modality embedding ($m_{real}^{s}$);
  passing the facial emotions through a third network of the neural network to produce a real facial emotion embedding ($e_{real}^{f}$); and
  passing the speech emotions through a fourth network of the neural network to produce a real speech emotion embedding ($e_{real}^{s}$);
 for a fake video of the first subject:
  extracting facial features from visual content of the fake video, the facial features including facial modalities and facial emotions;

extracting speech features from audio content of the fake video, the speech features including speech modalities and speech emotions;

passing the facial modalities through the first network to produce a fake facial modality embedding ($m_{fake}^f$)

passing the speech modalities through the second network to produce a fake speech modality embedding ($m_{fake}^s$);

passing the facial emotions through the third network to produce a fake facial emotion embedding ($e_{fake}^f$); and passing speech emotions through the fourth network to produce a fake speech emotion embedding ($e_{fake}^s$);

determining a first similarity loss $\rho_1=\max(L_1+m_1, 0)$, where:

'max' denotes a maximum value:

$m_1$ is a margin value; and $L_1$ is a first similarity score for the speech and facial modality embeddings;

determining a second similarity loss $\rho_2=\max(L_2+m_2, 0)$, where:

$m_2$ is a margin value; and $L_2$ is a second similarity score for the speech and facial emotion embeddings; and adjusting the first, second, third, and fourth neural networks dependent upon a sum (L) of the first similarity loss and the second similarity loss, where, when the audio content has been modified more than the visual content:

$L_1=d(m_{real}^f, m_{real}^s)-d(m_{real}^f, m_{fake}^s)$, where $d(x, y)$ denotes a distance between arguments x and y; and $L_2=d(e_{real}^f, e_{fake}^f)-d(e_{real}^f, e_{fake}^s)$, and when the visual content has been modified more than the audio content:

$L_1=d(m_{real}^f, m_{real}^s)-d(m_{real}^s, m_{fake}^f)$; and $L_2=d(e_{real}^s, e_{fake}^s)-d(e_{real}^s, e_{fake}^f)$.

17. The computer-implemented method of claim 16, further comprising determining whether the audio content has been modified more than the visual content or the visual content has been modified more than the audio content, including:

comparing the facial features of the real video to the facial features of the fake video; and comparing the speech features of the real video to the speech features of the fake video.

18. The computer-implemented method of claim 16, where the facial and speech emotions include one or more of 'happy', 'sad', 'angry', 'fearful', 'surprise', 'disgust' and 'neutral' emotions.

19. The computer-implemented method of claim 16, where:

passing the facial features through the first network includes passing the facial features through one or more of:
a two-dimensional convolution layer,
a max-pooling layer,
a fully-connected layer, and
a normalization layer; and where passing the speech features through the second network includes passing the speech features through one or more of:
a two-dimensional convolution layer,
a max-pooling layer,
a fully-connected layer, and
a normalization layer.

20. The apparatus of claim 1, where the first, second, third, and fourth networks are trained using real and fake videos to maximize the distance between a facial and a speech embedding of real and fake videos and minimize the distance between a facial and a speech embedding of real videos.

* * * * *